United States Patent Office 3,532,272
Patented Oct. 6, 1970

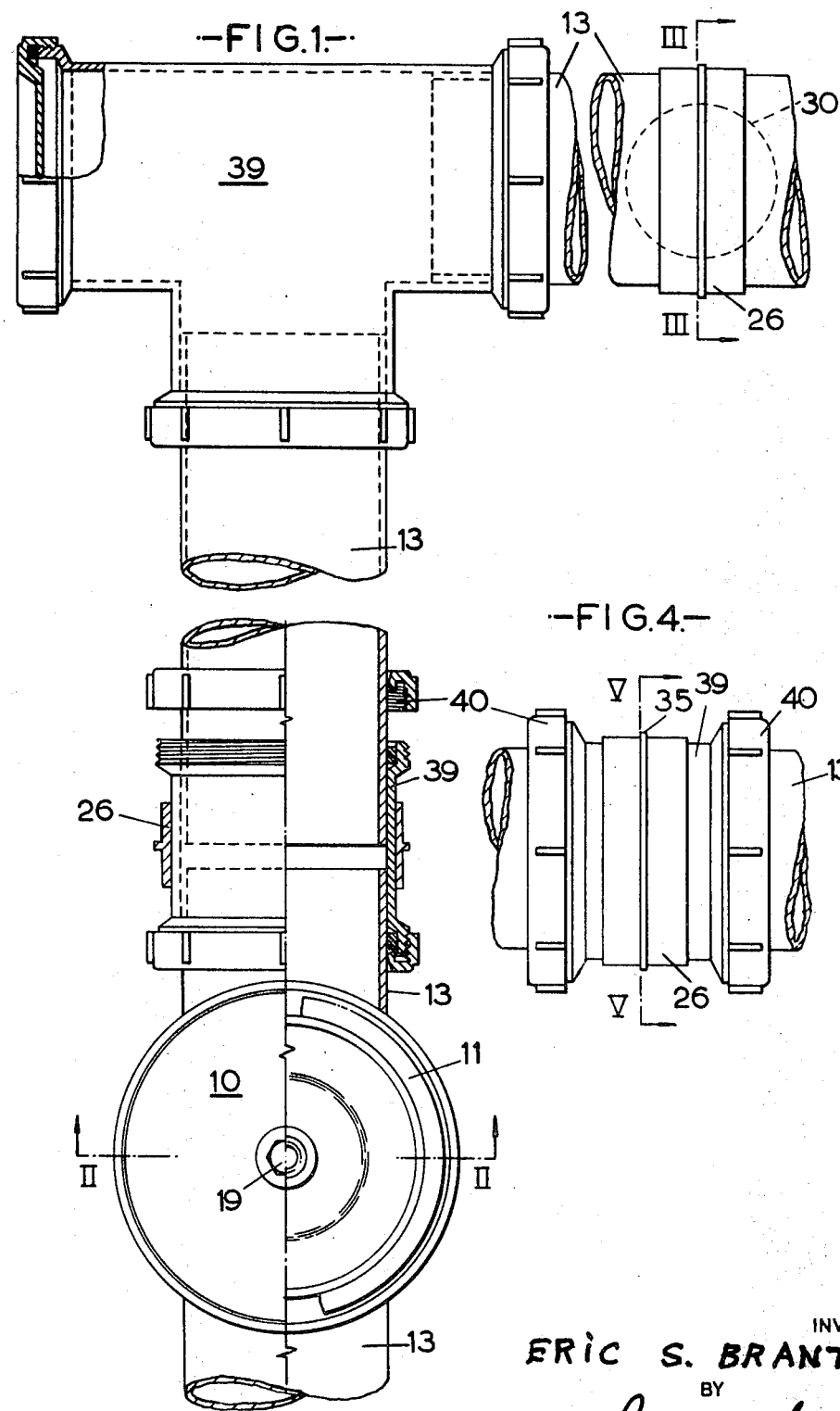

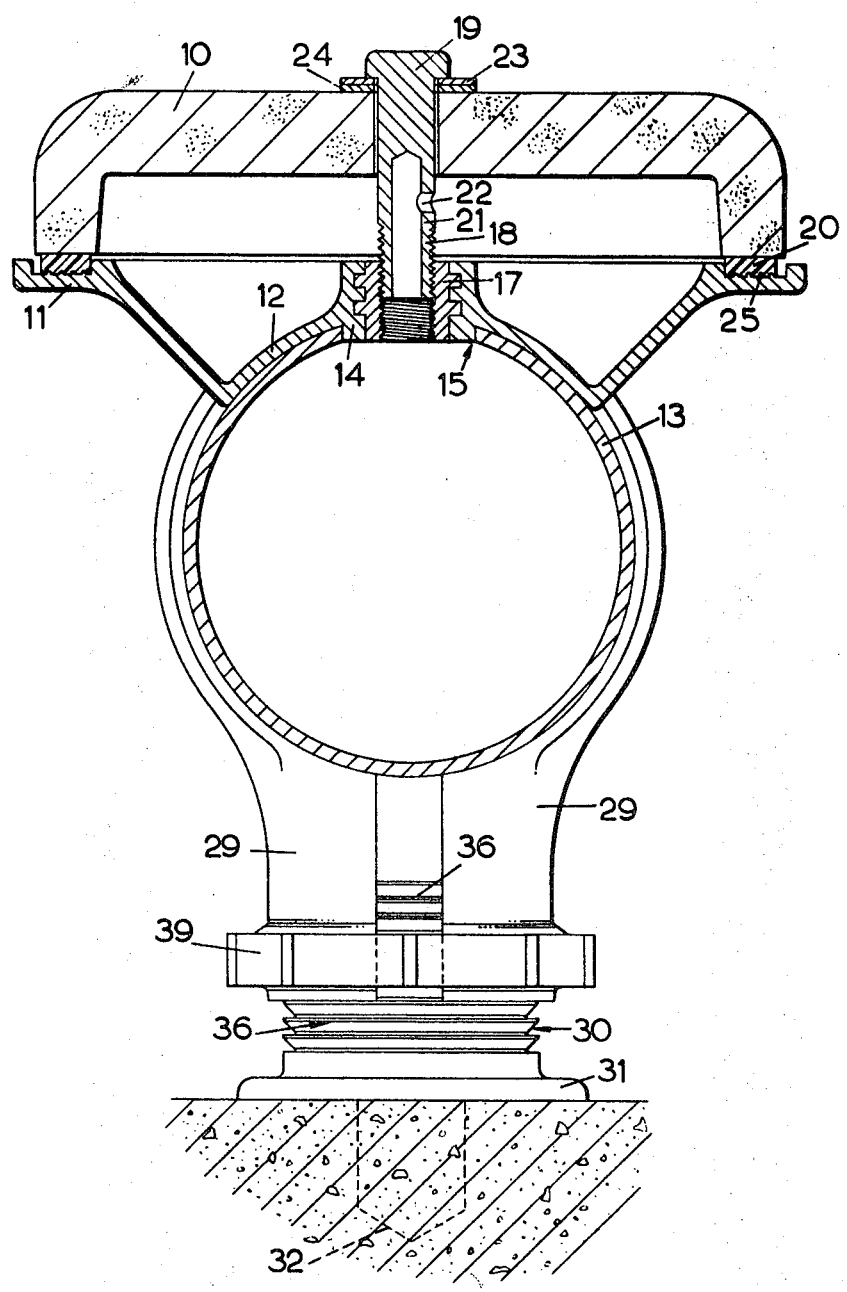

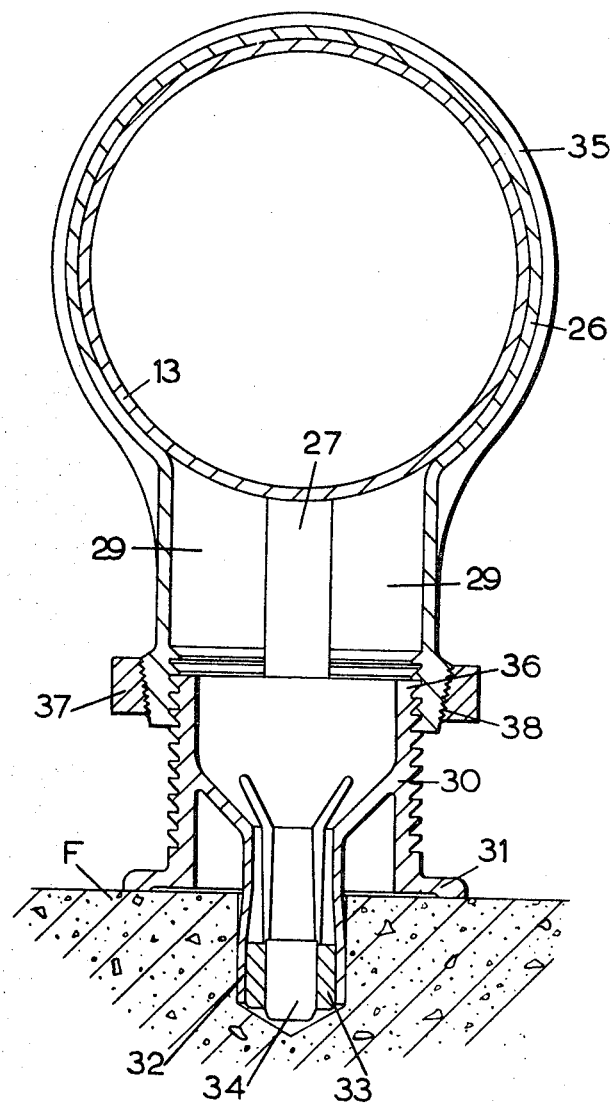

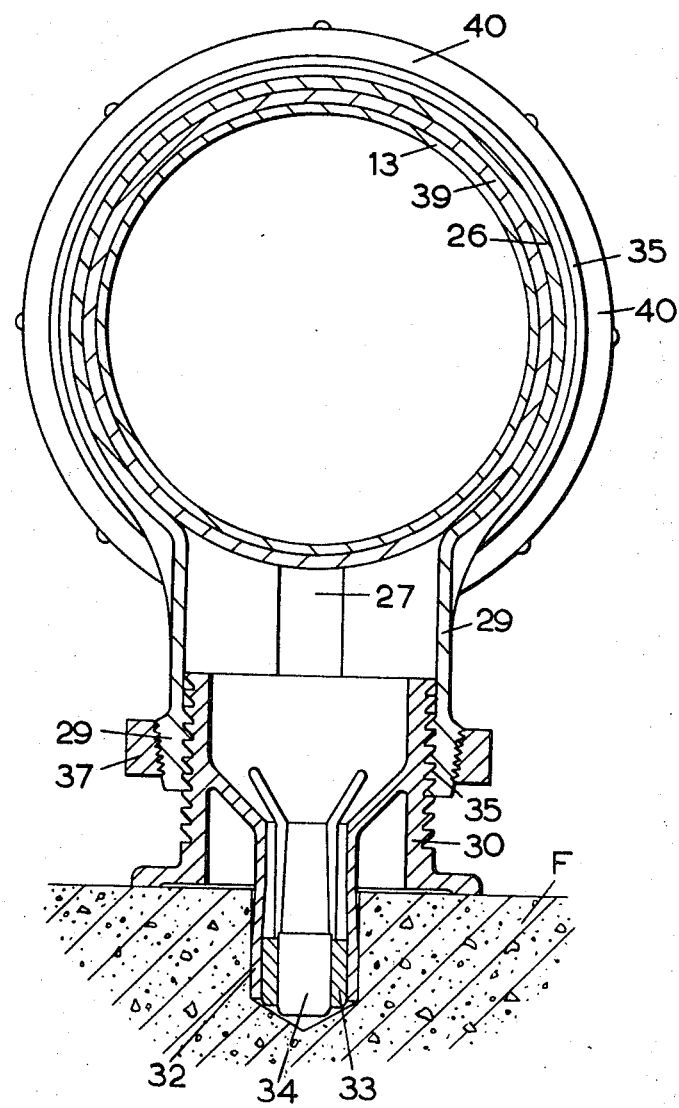

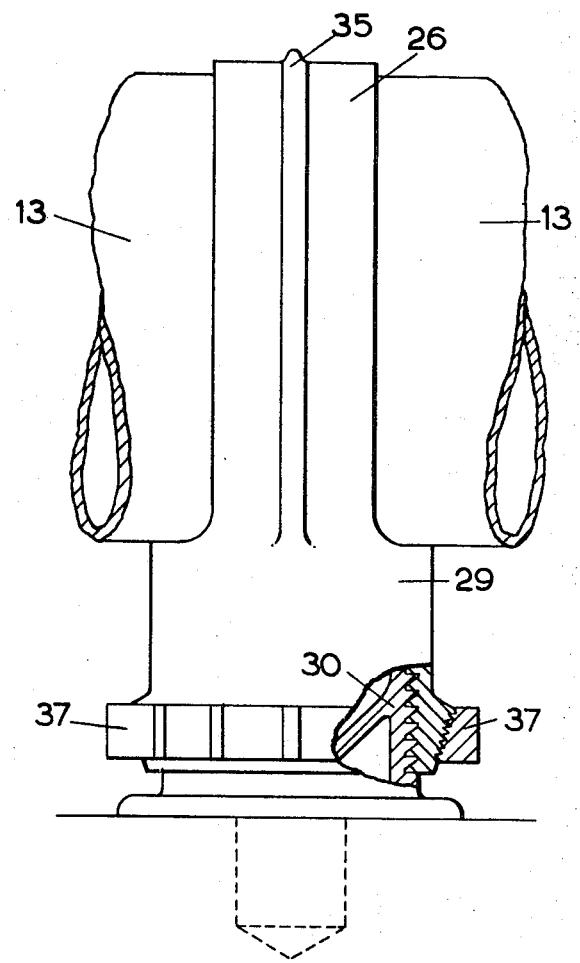

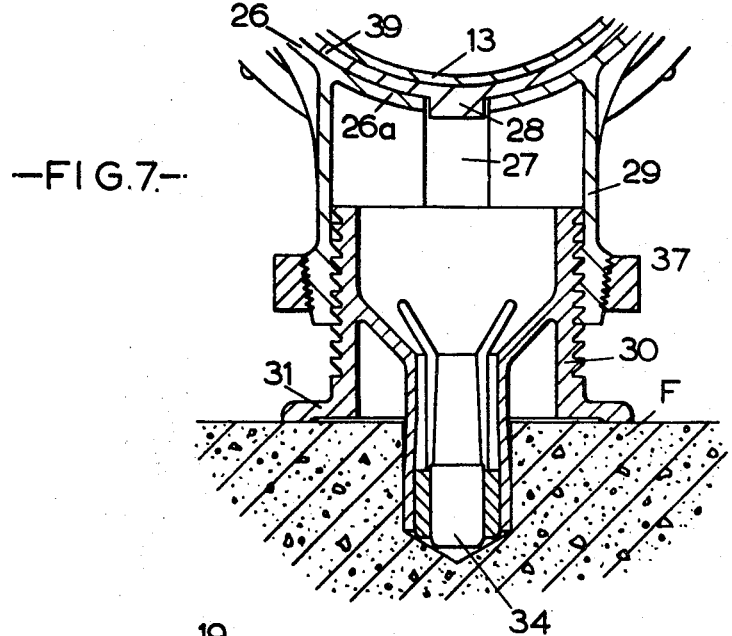
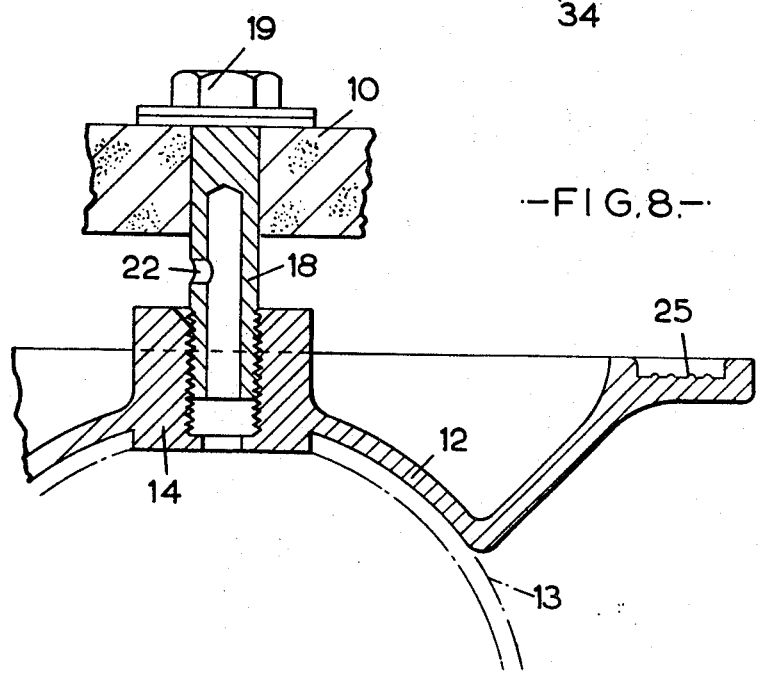

3,532,272
MEANS FOR DIFFUSING GASES INTO LIQUIDS
Eric Sidney Branton, Romford, England, assignor to Activated Sludge Limited, London, England, a British company
Filed Mar. 6, 1968, Ser. No. 711,119
Claims priority, application Great Britain, Apr. 21, 1967, 18,360/67
Int. Cl. A01g 27/00
U.S. Cl. 239—145      1 Claim

ABSTRACT OF THE DISCLOSURE

A gas diffuser (e.g. for diffusing air into sewage for the purification thereof by the activated sludge process) is mounted on a gas supply pipe by a mounting means having a saddle part adapted to embrace the pipe and a seating or baseplate part for supporting a gas diffuser over a gas discharge opening, in said pipe, so that gas passing therethrough is diffused through the diffuser. The saddle may have a gas passage which mates spigot-and-socket fashion with the opening in the pipe.

The saddle part and the seating or baseplate part may be formed integrally one with the other and conveniently are of a plastics material so that the saddle can be bonded to the pipe when the latter is also of plastics material. The gas passage in the saddle may be in the form of a tubular or hollow bolt, stud or the like which, in addition to providing a gas flow connection between the opening in the pipe and the interior of the gas diffuser, serves to clamp or secure the diffuser in a fluid-tight manner onto its seating or baseplate.

---

This invention is for improvements in or relating to means, hereinafter referred to as a diffuser or diffusers, for diffusing gases into liquids.

Diffusers of the character with which the present invention is concerned are commonly made of porous stone or other material and are used extensively, for example, for diffusing air into sewage in the activated sludge process of sewage purification.

In one known arrangement for diffusing air into sewage, for the purification thereof by the activated sludge process, a plurality of inverted dish-shaped or dome-shaped diffusers having porous walls are mounted at spaced intervals on and along an air supply pipe or main, each diffuser being positioned over an orifice in said supply main so that it receives air therefrom. This air is diffused through the walls of the diffusers, in the form of small bubbles, into the sewage or other liquid to be treated, the supply main and the diffusers being located at or towards the lower part of a treatment tank for the sewage or other liquid.

Until fairly recently the air supply main or pipe was made of cast iron but it is now contemplated that other materials will be more satisfactory, particularly but not essentially a plastics material, e.g. unplasticised polyvinyl chloride,, hereinafter referred to as U.P.V.C.

The use of an air supply pipe or main of plastics material (e.g. U.P.V.C.) has introduced a requirement for modifications in other components of the diffuser system and in particular a new means for mounting the diffusers on the air supply pipe or main.

An object of the present invention is to meet this requirement.

According to the present invention there is provided means for mounting a gas diffuser over a gas discharge opening in a gas supply pipe or main, comprising a saddle part adapted to embrace the pipe or main and having a seating or baseplate for supporting a gas diffuser over said gas discharge opening so that gas passing therethrough is diffused through the diffuser.

Conveniently the saddle has a gas passage which mates spigot-and-socket fashion with the opening in the pipe.

Preferably the saddle and seating are formed integrally as a moulding of plastics material so that the saddle can be bonded (e.g. by solvent welding) to the pipe.

Conveniently, the gas passage in the saddle includes a tubular or hollow bolt, stud or the like which serves to clamp or secure the diffuser in a fluid-tight manner onto its seating or baseplate.

One particular embodiment of the invention will now be described, by way of example, as applied to an air diffuser system, with reference to the accompanying drawings in which:

FIG. 1 shows a small portion of a diffuser pipe system having a porous stone diffuser mounted on it, FIG. 2 is a cross-section on the line II—II of FIG. 1, FIG. 3 is a cross-sectional view on the line III—III of FIG. 1 and shows a combined clip and stand for the air supply pipe in a position of highest adjustment, FIG. 4 shows an expansion joint embodied in the diffuser pipe system, FIG. 5 is a cross-section on the line V—V of FIG. 4 and shows the combined clip and stand arrangement for supporting the gas supply pipe at an expansion joint, FIG. 6 is a side elevation of the combined clip and stand shown in FIG. 3 but in the position of lowest adjustment, and FIGS. 7 and 8 are fragmentary sectional views of modifications.

Referring to the drawings, the inverted dish-shaped or dome-shaped diffuser 10, of porous stone or other porous material, is mounted on an annular baseplate or seating 11 which is formed as an integral part of a saddle 12. The combined baseplate and saddle 11, 12 are made as a one-piece component of U.P.V.C. by a process of injection moulding.

The saddle is mounted on the air supply pipe or main 13 and has a centrally located hollow boss or spigot 14 which enters and makes fluid-tight engagement with a hole or socket 15 in the pipe 13.

There will, of course, be very many of the holes 15 at spaced intervals along the pipe 13 each one being fitted with a saddle and diffuser arrangement as now being described.

After the saddle 12 has been mounted on the pipe 13 it is bonded or secured thereto by a process of solvent welding or by a hot or other welding process according to the plastics material of which the component is made, the pipe also being of a plastics material, e.g. U.P.V.C.

A brass insert 17 is embedded in the boss 14 of the saddle and is screw-threaded to receive the shank 18 of a bolt 19 by which the diffuser 10 is clamped to the baseplate 11. A rubber or other sealing gasket 20 is provided between the lower face of the dome diffuser and the baseplate 11 to ensure a fluid-tight joint therebetween, the gasket 20 being positioned in an annular channel in the baseplate.

The shank 18 of the bolt 19 has a tubular portion 21 which communicates with a lateral hole 22, the size of which controls the air flow. Thus, air can flow from the main or pipe 13 into the interior of the dome 10 via the tubular passage 21 and the hole 22, this air being diffused through the porous walls (top and side) of the dome or diffuser 10.

A brass or plastics washer 23 and a neoprene or like washer 24 are provided between the head of the bolt 19 and the diffuser to ensure a fluid-tight joint.

A thread for the lower end of the bolt 18, 19 is moulded in the boss 14 of the saddle, as shown in FIG. 8, instead of being formed in a separate brass insert embedded in said boss.

Annular ribs or ridges 25 may be provided around the baseplate 11 so as to co-operate with the rubber gasket 20 in ensuring a fluid-tight joint.

The combined pipe clip and stand for the air pipe or main 13 comprises (see more particularly FIG. 3) a cylindrical clip 26 which is slid onto the pipe 13 and embraces it for substantially the whole of its circumference.

The stand comprises a socket part in the form of opposite disposed arcuate wings 29, formed integrally with the clip 26, and a hollow spigot part 30 having a base 31 and a split base anchor 32. The wings 29 form together a tubular stem for the clip 26 which is cylindrical except for the diametrically opposite or circumferentially spaced gaps 27. These gaps enable the clip resiliently to grip the pipe. The base anchor 32 is somewhat like a split collet having a central sleeve 33 which is preferably a split sleeve. By driving into it a locking plug 34 it can be expanded into firm engagement with the concrete or like foundation F which it may be assumed is the floor of a sewage treatment or like tank.

The clip 26 is formed with a circumferential stiffening rib or bead 35.

The spigot part 30 of the stand and the socket part 29 of the clip are formed with circumferential interfitting serrations or teeth 36. When the spigot part 30 has been caused to penetrate the socket part 29, to set the clip at the required height relatively to the baseplate 31 and foundation F, between the upper and lower limits indicated in FIGS. 3 and 6 respectively, the parts 29 and 30 are firmly locked together by screwing up a tapered locknut 37 on a tapered thread 38 provided on the socket part 29. This serves to clamp the wings 29, forming said socket part, firmly into engagement with the teeth 36 of the spigot part 30.

The expansion joints incorporated in the diffuser pipe system include a sleeve 39 and glands 40. Such a sleeve forms one convenient part of the diffuser pipe system for mounting in one of the combined clip and stand devices as shown in FIGS. 4 and 5.

The gaps 27 may, if necessary, receive a locating boss or rib 28 on the sleeve 39 (see FIG. 7) or on the pipe 13 if it is seated directly in the clip. Furthermore, the clip may be extended in circumference as indicated at 26a in FIG. 7.

The diffuser 10 may be of a porous plastics material.

The clip 26, locking ring or nut 37, stand 30, base anchor 32, sleeve 33 and plug 34, or one or some of these parts may be made of a plastics material, e.g. U.P.V.C.

I claim:
1. A diffuser system adapted to be immersed in sewage liquor for diffusing gas thereinto, comprising in combination,
an elongate thin-walled pipe of synthetic resinous material having connection to a gas supply and provided with an opening through a wall portion thereof,
a diffuser assembly cooperating with said opening, said diffuser assembly comprising a saddle having a central boss portion radially outstanding from said pipe provided with a bore, and seated in registry with said opening, and arcuate limbs on either side of said boss portion in face-to-face contact with the other surface of said pipe, said saddle also including a dished wall portion having its base circumferentially joined with said limbs in surrounding relationship to said boss and projecting away from said pipe, said dished wall portion terminating in an annular baseplate presenting a seat,
means permanently bonding the opposed surfaces of said limbs to said pipe,
a porous, dished diffuser seated upon said baseplate and defining, with said saddle, a gas space, and,
a fastener anchored at one end in said boss portion and bearing at its opposite end against said diffuser to maintain the latter in seated condition against said baseplate, said fastener having a blind bore therein communicating with said pipe and having a lateral opening leading to said gas space.

References Cited
UNITED STATES PATENTS

| | | | |
|---|---|---|---|
| 1,152,636 | 9/1915 | Houston | 239—207 X |
| 2,430,749 | 11/1947 | Van Denburg | 261—122 |
| 2,639,131 | 5/1953 | Coombs | 261—122 |
| 2,946,518 | 7/1960 | Wahlin | 239—266 |
| 3,009,655 | 11/1961 | Palmer | 239—266 X |
| 3,425,630 | 2/1969 | Fessler | 239—208 |

FOREIGN PATENTS 134,927  10/1949  Australia.

SAMUEL F. COLEMAN, Primary Examiner

H. S. LANE, Assistant Examiner

U.S. Cl. X.R.

239—207; 261—122